United States Patent [19]

Boehringer

[11] 3,871,364

[45] Mar. 18, 1975

[54] PEAK FLOW METER-EXPIRATORY FLOW RATE

[76] Inventor: John Randall Boehringer, 427 Parkview Dr., Wynnewood, Pa. 19096

[22] Filed: Sept. 24, 1973

[21] Appl. No.: 399,816

[52] U.S. Cl. ............................... 128/2.08, 73/211
[51] Int. Cl. .............................................. A61b 5/08
[58] Field of Search .......... 128/2.08, 2 C; 272/57 F; 73/419, 211; 339/255 L, 273 S; 292/305

[56] References Cited
UNITED STATES PATENTS

| 471,389 | 3/1892 | Lacey | 128/2.08 |
|---|---|---|---|
| 1,949,293 | 2/1934 | Crowley | 73/419 |
| 2,999,495 | 9/1961 | Shipley | 128/2.08 |
| 3,385,112 | 5/1968 | Pruitt et al. | 73/211 |
| 3,635,214 | 1/1972 | Rand | 128/2.08 |
| 3,678,754 | 7/1972 | Amir et al. | 73/419 |
| 3,720,202 | 3/1973 | Cleary | 128/2.08 |

FOREIGN PATENTS OR APPLICATIONS

| 1,160,669 | 8/1969 | United Kingdom | 128/2.08 |
| 813,701 | 11/1936 | France | 292/305 |
| 250,828 | 10/1911 | Germany | 292/305 |
| 765,041 | 12/1933 | France | 128/2.08 |

Primary Examiner—Richard A. Gaudet
Assistant Examiner—Lee S. Cohen
Attorney, Agent, or Firm—Paul & Paul

[57] ABSTRACT

A housing defines first and second cavities, the first cavity having an input port for the user to breathe into, and an output port of variable size. The second cavity is cylindrical, communicates with the first, and has an output port. A piston divides the cavities, being restricted in motion by the force of a spring. At the output port for the second cavity, a shaft penetrates a plug. In a preferred embodiment, the shaft is connected to the piston, and the plug includes apparatus for locking the shaft in the position of its peak excursion.

7 Claims, 4 Drawing Figures

PATENTED MAR 18 1975

3,871,364

PEAK FLOW METER-EXPIRATORY FLOW RATE

BACKGROUND OF THE INVENTION

This invention relates to apparatus for the measuring of respiratory functions. More particularly, it relates to peak exhalation flow rate meters.

In order effectively to diagnose respiratory ailments and generally to evaluate the respiratory capabilities of a given patient, there exists a need for an effective, versatile, easy to use peak exhalation flow meter. Preferably, of course, such meter should be economical in cost and maintenance.

Peak flow measurement devices should be distinguished from spirometers in that while the former seek only to measure the maximum flow of air, the latter are directed to measurement of the volume of air which enters and leaves the lungs. Thus, these two classes of respiratory measurement devices involve very different functional and structural considerations. For example, while flow meters should present as little occlusion as possible to the exhaled air, spirometers must effectively contain all of the air exhaled in order effectively to measure the volume thereof.

Generally, the requirements of an effective peak exhalation flow rate meter may be rather concisely expressed. It should be apparent that youths and adults have very different respiratory capacities, both in terms of flow rate and volume. Likewise, healthy persons have very different respiratory capabilities from those with respiratory ailments such as emphysema. In order effectively to measure the flow from all such classes of persons, peak flow rate meters must have a very broad operating range and must be substantially independent of the volume of air expelled by the user. Also, the readings which are obtained must be of a rather high degree of accuracy. Moreover, the meter must involve low internal inertia, such that it is sensitive to brief transient peaks. Finally, the meter used for peak flow rate measurement must be relatively free of back pressure problems such that the person monitored will not be forced to exert stresses on his respiratory system.

Primary objects of the present invention include providing peak flow rate measurement apparatus which not only satisfies the foregoing general requirements of such meters, but furthermore which is relatively simple of construction, possesses a high degree of mechanical reliability, and is relatively simple and economical both to service and to use.

SUMMARY OF THE INVENTION

The foregoing objects are substantially realized in a peak flow meter in which an outer housing defines a cavity having an input port and an output port, and which communicates with another cavity, this second cavity having an output port. Dividing the cavities is a piston having a controlled amount of clearance with cavity walls and being restricted in travel toward the second cavity by the retarding force of a spring. Flow is measured by the position of a shaft at the end of the second cavity, the shaft being moved by corresponding motion of the piston. Adjustable apparatus such as a pivotable plate covers a specified portion of the output port of the first cavity such that variable amounts of air flow apply correspondingly different actuating forces to the piston.

In accordance with the foregoing embodiment, it may be appreciated that variation of the size of the output port by the pivot plate allows for a multiple scale reading to be taken from piston displacement. Moreover, since the piston does not require a tight fit in the second cavity, frictional back pressures are minimized in a manner which actually also lowers cost. The overall configuration is amenable to a compact construction such that very little air volume is required to achieve accurate flow measurements. Finally, the mechanical simplicity of the arrangement affords considerable mechanical reliability at extremely economical costs.

DETAILED DESCRIPTION

The following discussion relates to two separate embodiments of the principles of the present invention, both of which share the common attributes of having a piston loosely fit between two cavities. The piston is mobile by the force of exhaled air, but that motion is restrained by the controlled retarding force of a spring. On an input side of the piston, an input port allows for breathing in, and calibrated variable output ports allow for a prescribed amount of exhaust. The balance of the flow is conducted to and past the piston, and is exhausted through an output port in a second cavity. In particular, the region of the output port of that second cavity includes apparatus for locking into position a shaft which penetrates the output port, and the lateral position of which is established by the piston. In a first embodiment this locking is achieved by means of a magnetic catch on a free traveling metallic shaft, and in a second embodiment the stopper includes balls mobile in a frustoconical cavity which prevent the shaft from receding due to the spring force on the piston.

Figure 1B:
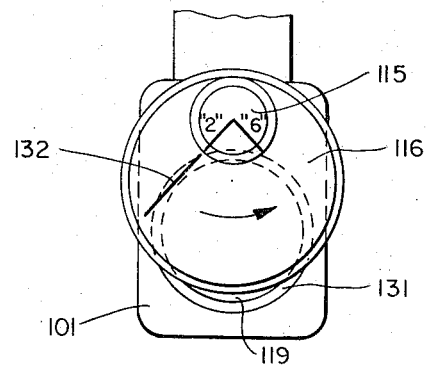
FIGS. 1a and 1b show a first illustrative embodiment of the principles of the present invention.
Figure 1A:
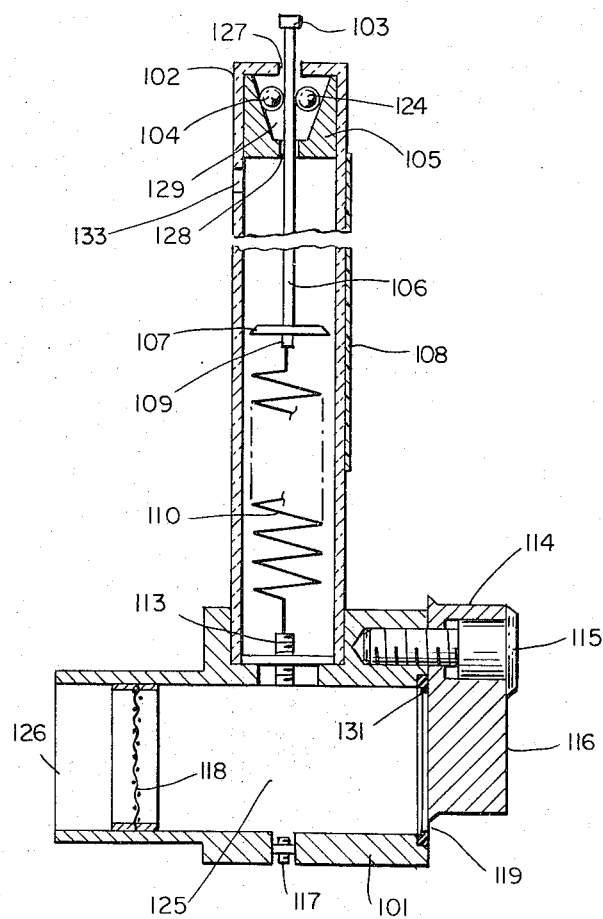

Referring first to FIG. 1a, there is shown in cross-section a first illustrative embodiment of the principles of the present invention. A main housing shown generally as 101 defines a first cavity 125 through which exhaled air is to pass. More particularly, the patient is to exhale into the cavity 125 through the mouth piece shown generally as 126. Thereupon, the air flows through the cavity 125 and out a variable orifice 119. A window screen 118 is provided in the mouth piece region of the cavity 125, but such apparatus is entirely optional. Attached transversely to the main body 101 is a cylindrical structure 102 which houses mobile piston 107. The upper chamber which is formed by the cylinder 102 communicates with the lower chamber 125 which is formed by the main body 101, thereby causing air which is exhaled into the chamber 125 by means of mouth piece 126 also to flow upwardly into the cylinder 102. As may be seen from the drawing, the fit of piston 107 in the cylinder 102 is not precise; rather, a predetermined amount of clearance is provided between the piston 107 and the cylinder walls 102 such that air may flow around the piston upwardly through the cylinder, and outwardly through an exhaust and damping port 133. Attached to the piston 107 is a shaft 106 which extends upwardly to penetrate the stem retaining means. The lower end of the piston and shaft assembly 106 and 107 is attached to a coil spring 110 which extends downwardly and is affixed to the overall structure either in the area of merger 113 between the cylinder 102 and the main body 101, or alternatively at at the corresponding bottom portion of the main body, shown at point 117 in FIG. 1a. The spring 110 tends to exert a downward force on the piston 107 and the shaft 106, thereby acting contrary to the upward force applied to piston 107 by the flow of exhaled air in the cavities. In fact, these opposing forces are the one which result in the calibrated flow readings which characterize the operation of the principles of the present invention.

At the top end of the cylinder 102 is a plug 105 which also defines a frustoconical chamber 129 having sides which slope outwardly toward the top of the cylinder 102. As may be seen from FIG. 1a, the shaft 106 penetrates both openings 128 and 127, but further provides clearance for passage of air from the inner part of the cylinder 102, through the cavity 129, and outwardly through the port 127.

In FIG. 1, a scaled film 108 overlies the surface of the cylinder 102. In accordance with the embodiment shown, the flow of air is to be measured by the peak excursion of the piston 107, and consequently, the position may be read directly from a corresponding scale which overlies the cylinder 102. The scales 108 may therefore be embodied as a pressure sensitive film which is imprinted with one or more scales, for which the position of the piston 107 corresponds to particular exhalation flow peaks.

The main exhaust orifice is a variable one, thereby providing facility for multiple scale readings. More particularly, the embodiment of FIG. 1a includes a pivotable plate member 116 which is affixed to the main body 101 by means of a set screw 115. As shown, the sides 114 of the plate 116 are knurled such that twisting force may effectively be applied to pivot the plate 116 around the screw 115. The operation of the plate 116 to regulate the size of the orifice 119 and therefore to regulate the amount of air permitted to flow between input port 126 and output port 119 may be appreciated by consideration of FIG. 1b. It may there be seen that the set screw 115 maintains the plate 116 in a variable position relative to the main body 101. More particularly, the main body defines a passageway which is partially blocked by the plate 116, and which is faced with a terminating lip 131 which insures a close, leak-free fit between the plate 116 and the main body 101. For the embodiment of FIGS. 1a and 1b, a two scale reading is to be utilized. Consequently, screw 115, which remains in a fixed position, includes two markings, one designated "2" and the other designated "6," with each of the markings having a corresponding radial line imprinted on the screw head 115. Imprinted on the outer surface of the plate 116 is a sector line 132 which is radial relative to the center point of screw 115. Thus, as the plate 116 is twisted about the screw 115, the marking line 132 may be arranged to coincide with the imprinted "2" line on the screw 115, or alternatively with the marking line imprinted with a "6" on the screw 115. As the plate is so rotated, the size of the opening 119 of course changes correspondingly, because the pivot point of the plate 116 is the center of the screw 115. The various imprinted markings on the screw 15 may of course be arranged appropriately to calibrate the device for any given air flow range. It then only remains to calibrate the overlay 108 on the cylinder 102 with scales appropriate for the deflection of the piston 107 which results from the different amount of back flow caused by restricting the size of the orifice 119.

The embodiment of FIGS. 1a and 1b operates as follows. First, the plate 116 is arranged such that the marking line 132 coincides with a corresponding marking line on the screw 115 in an appropriate peak flow rate range. Thereupon, the piston 107 is arranged at its lowermost point in the cylinder 102, and the user holds the apparatus to his mouth and exhales into the chamber input opening 126. Generally, the flow of air is through the cavity 125 and against the output portion of the apparatus. Depending upon the size of the orifice 119, however, a certain amount of back pressure is created against the inner portion of the plate 116, thereby controlling air flow upwardly through the cylinder 102. This air pressure flows both around the side of the piston 107 and against its lower portion, thereby forcing the piston 107 and the shaft 106 upwardly. Due to the inverted frustoconical shape of the cavity 129, the balls 104 and 124 afford no resistance to the upward motion of the shaft 106. When the user has stopped forcing air into the apparatus, however, the downward force of the spring 110 on the piston 107 tends to pull the shaft 106 downwardly. At such time, however, balls 104 and 124 are forced between the shaft 106 and the walls of the plug 105, and further downward motion of the shaft 106 with its piston 107 is prevented. In the arrangement of the scale overlay 108, the additional flow of air between the piston 107 and the walls of cylinder 102 is also calibrated, such that effective measurement results even in the absence of the close tolerance fit. Thus, it is the total flow of air from both output ports 119, 133, and 127 which contributes to the flow measured by the position of piston 107 relative to the scale overlay 108. Moreover, since the balls 104 and 124 in conjunction with the plug 105 allow for upward motion of the shaft 106 but prevent downward motion thereof, the final position of the piston 107 corresponds to the peak flow of air exhaled by the user into the device.

Figure 2B:
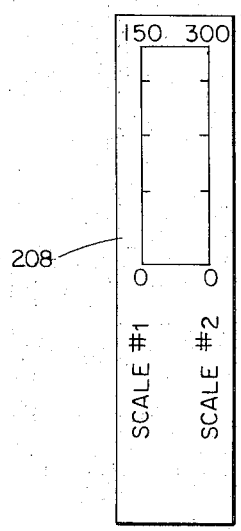
FIGS. 2a and 2b show a second illustrated embodiment of the principles of the present invention.
Figure 2A:
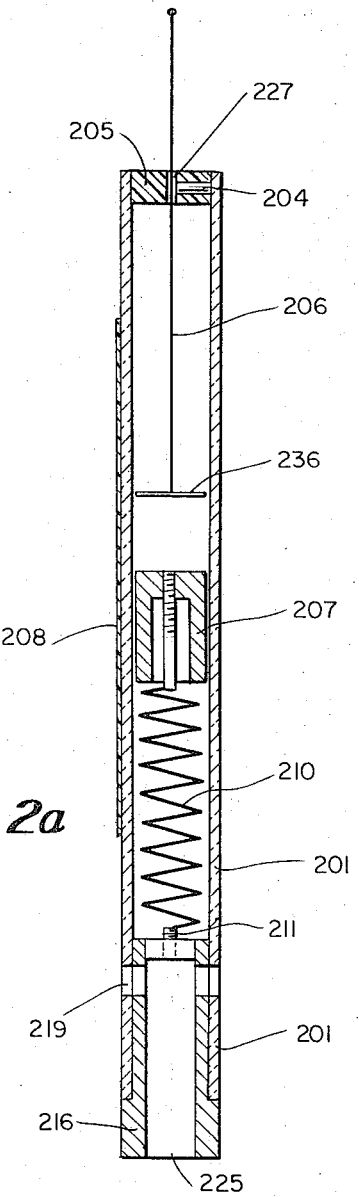

In the embodiment of FIG. 2a, a physical structure different is appearance but similar in salient characteristics is presented. The peak flow rate meter of FIG. 2 includes a cylindrical shaft 201 through which a piston 207 travels. At the input end of the tube 201 is a mouthpiece 216 which fits into the cylinder 201 and which is rotatably mounted therein. A spring 210 connects the piston 207 to a lower point 211 in the mouthpiece section, such that as air is expelled into the mouthpiece 216 at input orifice 225, it is forced against the piston 207. As in the foregoing embodiment, piston 207 has a controlled clearance between its own walls and the inside walls of the cylinder body 201, such that air coming into cylinder 201 not only is forced against the piston 207, but also passes around its sides and outwardly to an exhaust port 227.

The far end of the embodiment of FIG. 2 includes a rectangular plug 205 which defines the exhaust port 227. Embedded in the plug 205 is a magnet 204, and penetrating the exhaust port 227 is a metallic wire 206 which terminates at its lower end in a transverse member 236. The composition of the shaft 206 may be any material which will adhere to the magnet 204, typically hard drawn stainless steel wire (magnetic).

The principle exhaust port of the FIG. 2 meter is provided by one or more openings 219 in the mouth piece region of the apparatus. More particularly, at output port 219 the outer cylinder 201 is penetrated by one or more openings. In that same region, the mouth piece portion which is mounted within the cylinder 201 is also penetrated with one or more holes of varying diameter. Thus, as the mouth piece 216 is twisted within the main cylinder 201, the coincidence of holes in the mouth piece 216 and in the cylinder 201 forms exhaust ports 219 of varying size. Therefore, concommitant passage for flow of exhaled air is provided. Mounted on the outside of the tube 201 is a scale overlay 208 similar in composition and function to the overlay 108 of the FIG. 1a embodiment. In the FIG. 2 embodiment, however, the transverse member 236 of the shaft 206 is the one which contributes to the reading.

The operation of the FIG. 2 embodiment is therefore quite similar to that of FIG. 1a. Initially, a proper flow range is calibrated by twisting the mouth piece element 216 relative to the cylinder 201 such that the proper output orifice 219 results. Since the piston 207 is freely mobile in both directions, it necessarily will be initially at the zero point. The shaft 206 must therefore be pressed toward the piston 207 until the transverse member 236 is in contact with the top of the piston 207. Thereupon, the user exhales into the input portion 225 of the mouth piece 226, with the concommitant flow of air against the piston 207, around the piston 207 and out port 227, and out calibrated exhaust ports 219. The flow causes the piston 207 to move against the force of spring 210, and consequently to move the shaft 206 along with it. Whenever this force has stopped, however, the piston 207 is pulled back to position by spring 210, but the shaft 206 remains at its peak excursion position due to the retentive force exerted by the magnet 204 in the plug 205. The position of the transverse member 236 with the appropriate scale of the overlay 208 of FIG. 2b. By using two ports 219 and closing one manually, two ranges are provided.

While the embodiments described herein have utilized the final position of the piston as a reading point, it should be apparent that other options may be utilized. For example, the traversal of any given point on the shafts 106 and 206 represents a similar measurement of peak expiratory flow. Likewise, free adaptation of the calibration for the output orifices 119 and 219 may be utilized to fabricate a peak expiratory flow rate meter in accordance with the principles of the present invention having any number of scales as seem appropriate, and likewise having scales of any desired extent.

From the foregoing description, it may be seen that the principles of the present invention readily satisfy the foregoing functional and structural objectives for construction of peak expiratory flow rate meters. First, due to the compact construction of the apparatus, very small volumes of air are required to achieve accurate flow rate measurements. Similarly, the clearance afforded between the pistons 107 and 207 and the corresponding cylinder walls 102 and 201 allow for an inexpensive yet highly accurate construction. Finally, the multiple scale adaptability provides facility for effective and accurate measurements over a large diversity of flow rates. Thus, the apparatus described is useful for patients having widely varying respiratory capabilities.

It is to be understood that the foregoing embodiments are intended to be illustrative of the principles of the present invention, and that numerous other embodiments will occur to those skilled in the art without departure from the spirit or the scope of the principles of the present invention as set forth herein and defined particularly by the appended claims.

What is claimed is:

1. Apparatus for measuring peak air flow comprising:
    housing means defining first and second cavities which communicate with one another, said first cavity having an input port and at least one output port and said second cavity having an output port;
    mobile piston means located in said second cavity and separating said first and second cavities, said piston means and the walls of the second cavity having a predetermined clearance therebetween, the output port of the second cavity being exclusively on one side of said piston means.
    spring means for restricting the motion of said piston means;
    indicating means for registering the peak excursion of said piston means, said indicating means including shaft means mobile with said piston means;
    and means for locking said shaft means in position of said peak excursion.

2. Apparatus as described in claim 1 wherein said housing means includes a plate pivotally mounted over the output ports of said first cavity, air flow from the output ports of said first cavity being limited by the position of said plate and the concommitant alteration of size of said output ports of said first cavity.

3. Apparatus as described in claim 1 wherein said second cavity is cylindrical in shape, with one end communicating with said first cavity and the other end conditioned to include said indicating means, said spring means being affixed between said housing means and said piston means.

4. Apparatus as described in claim 3 wherein said shaft means is connected to said piston means, and said means for locking includes a plug in said second cavity which defines a frustoconical cavity having sides sloping away from said piston means, and balls in said frustoconical cavity for limiting travel of said shaft toward said piston means by being lodged between said plug and said shaft means by downward force on said shaft.

5. Apparatus as described in claim 1 wherein said housing means forms a cylindrical body.

6. Apparatus as described in claim 1 wherein air flow scaling means demarcates said housing means in the range of mobility of said piston means.

7. Apparatus for measuring peak expiratory air flow from a user comprising:
    a first housing means defining a first cavity therein, one end of said means being adapted as a mouthpiece for receipt of expiratory air, and fitted with a screen to impede flow of particulate matter into said cavity, said means further defining a generally circular output port;
    a generally circular plate, larger in radius than said output port, affixed to said means above said output port, by means of a pivot screw located between the center and the periphery of said plate, whereby pivoting of said plate blocks a correspondingly variable extent of said output port;
    a generally cylindrical hollow member upstanding from said housing intermediate said mouthpiece and said output port, said member communicating directly at its lower end with said first cavity;
    a plug lodged in the top of said member defining an output port of predetermined size for said member said port including a frustoconical cavity as a portion thereof;

an elongate piston slidably located in said member, said piston having a lower circular portion defining a predetermined clearance with the walls of said member and having an upper shaft portion penetrating the output port in said plug;

a coil spring having one end affixed to said housing means and the opposite end affixed to said piston;

a plurality of bearings located in said frustoconical cavity, thereby permitting upward movement of said shaft and restricting downward motion thereof;

whereby calibrated flow of air from the output ports of said housing means and of said hollow member causes a displacement of said piston upwardly in said member in proportion to the peak expiratory air flow.

* * * * *